United States Patent [19]

Nagaoka

[11] 4,069,503

[45] Jan. 17, 1978

[54] APPARATUS FOR RECORDING AND REPRODUCING SIGNALS USING A DISC-LIKE RECORDING MEDIUM

[75] Inventor: Tadashi Nagaoka, Nishinomiya, Japan

[73] Assignee: Matsushita Electric Industrial Co., Ltd., Osaka, Japan

[21] Appl. No.: 521,153

[22] Filed: Nov. 5, 1974

Related U.S. Application Data

[63] Continuation of Ser. No. 316,489, Dec. 19, 1972, abandoned.

[30] Foreign Application Priority Data

Dec. 20, 1971 Japan .................................. 46-105003
Dec. 28, 1971 Japan .................................. 47-127
Dec. 29, 1971 Japan .................................. 47-275
Dec. 29, 1971 Japan .................................. 47-280

[51] Int. Cl.² ....................... H04N 5/76; G11B 15/38; G11B 3/20
[52] U.S. Cl. ..................... 358/128; 360/99; 360/102; 179/100.41 P; 274/37
[58] Field of Search ............... 360/102, 103, 99, 19, 360/86, 135; 179/100.1 B, 100.41 P, 100.41 R; 308/DIG. 1; 274/13 R, 39 R, 37; 178/6.6 R, 6.6 DD, 6.6A; 358/128

[56] References Cited

U.S. PATENT DOCUMENTS

| 2,921,144 | 1/1960 | Martin | 360/102 |
| 3,153,241 | 10/1964 | Ramrath | 360/102 |
| 3,225,338 | 12/1965 | Kelner | 360/99 |
| 3,368,210 | 2/1968 | Zimmer | 360/103 |
| 3,509,274 | 4/1970 | Kihara | 360/86 |

FOREIGN PATENT DOCUMENTS 1,172,310 6/1964 Germany ............... 360/99

Primary Examiner—Bernard Konick
Assistant Examiner—Alan Faber
Attorney, Agent, or Firm—Stevens, Davis, Miller & Mosher

[57] ABSTRACT

A recording and reproducing apparatus including a disc-like recording medium which rotates at high speed, a pick up device in contact with the medium and a means for displacing the pick up device positively in a radial direction of the medium, wherein the improvement resides in the condition of contact between the medium and the pick up being maintained in a good and stable manner due to either a convex base plate or an air baffle plate surrounding the disk.

6 Claims, 17 Drawing Figures

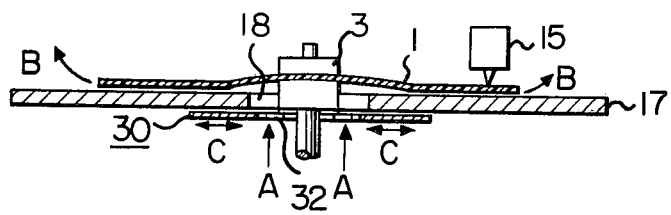
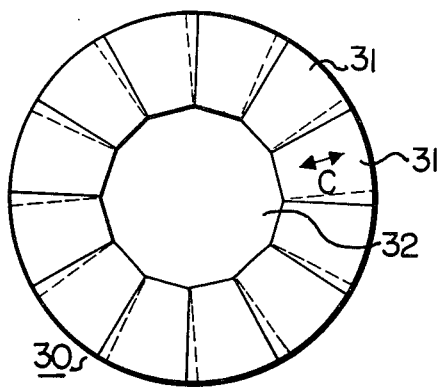
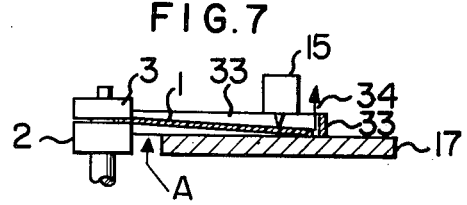
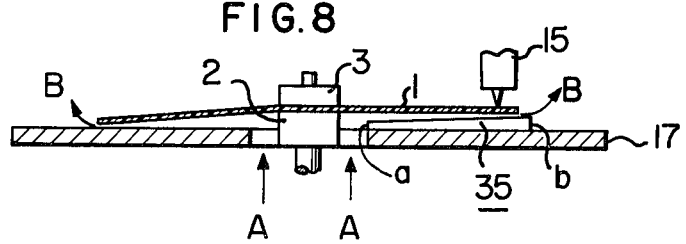

APPARATUS FOR RECORDING AND REPRODUCING SIGNALS USING A DISC-LIKE RECORDING MEDIUM

This is a continuation of application Ser. No. 316,489 filed Dec. 19, 1972, now abandoned.

This invention relates to a signal conversion apparatus of such a type as to record and to reproduce the signals by making a pick up element contact with a recording medium which rotates or moves at high speed in the atmosphere.

Hitherto such a method has been well known to record aural signals by forming a series of spiral groove on the disc, as well as to reproduce it, and it is readily thought that the signals of higher frequency such as television signals can be dealt with when the speed of the rotation of the disc is increased. However, it becomes necessary not only to increase the speed of rotation, but also to improve and modify the apparatus in order to make it possible to deal with such television signals the frequency of which is some 400 times as high as that of the aural signals.

Supposing that the outer diameter of the zone available for recording on the disc is 210 mm, the inner diameter is 84 mm, and the radial pitch of the spiral groove is 7 microns, it is possible to record for about 5 minutes when one frame of television signal is recorded in one rotation of the disc which rotates at 1,800 R.P.M.

The radial pitch of the groove seems to be too small comparison with that of the aural recording which is as large as about 100 microns, but it is necessary to design such small order of the pitch in order to attain a long recording time.

It should be understood that since the radial pitch of the groove is designed to be as small as 7 microns as described above, the depth of the groove must be limited within a few microns.

Also the signals must be recorded of vertical, not horizontal, from as in the case of the aural recording. Uneveness within the groove in accordance with the frequency modulated light signals of television, and the height of said unevennes will be necessarily limited within a scale of a few microns in accordance with the dimensions of the depth and the pitch of the groove.

As far as such an ordinary measure used in the aural recording is employed, it is impossible to make the pick up element, which may be a diamond stylus, suitably follow the spiral groove of a few microns in depth on the disc which rotates at a high speed of 1,800 R.P.M.

Therefore, a new method has been proposed in which not only the disc but also the pick up element itself are positively moved in a radial direction on the disc by the motor for rotating the disc.

In this method, the disc is formed to be a flexible sheet-like member, the material of which is for example a plastic, and is suspended by air which flows in a radial direction outwardly of the disc making contact with the back side of the disc during the rotation.

The radial movement of the pick up element is accomplished mechanically, and is exactly metered to correspond to the rotation in such manner that the pick up element advances just one pitch of the groove as the disc makes one revolution. The above described method enables the pick up of signals from such small grooves on the disc which rotates at high speed, however, there still remains some unsolved problems.

Namely, the disc tends to be distorted, the suspending air pressure varies according to the radial distance, the thickness and the stiffness of the disc cannot be exactly uniform and, the material property depends on the ambient temperature.

All of these unfavourable characteristics individually or in combination prevent the pick up element from maintaining a constant contact with the disc over the whole period of reproduction.

The variation of the contact pressure of the pick up element occurs even in a period of one revolution of the disc, and will necessarily cause the variation in the amplitude of the reproduction output, so that the output suffers unexpected amplitude modulation.

This problem can scarcely be solved by way of increasing the contact pressure which would necessarily lead to the rapid wear of the stylus and the disc.

As described above, the air pressure acting on the back side of the disc varies according to the radial distance; in other words the more distant from the center of the disc the lowr the pressure becomes because of the increase of the area of the pressure applied surface, so that the flexible disc is bent downwardly and the surface of the disc inclines.

In this circumstance, the vibration of the disc will occur as the air pressure is lowered to the atmospheric pressure in an abrupt manner at the circumference of the disc, which is of course undesirable for maintaining a good contacting condition.

Further, in order to maintain the constant contact, some adjusting apparatus is required to adjust the height of the pick up element incident to its movement so as to meet the height of the disc surface which varies according to the radial distance.

The present invention is aiming at providing the solution for such problems as described above.

An object of the present invention is to make it possible to rotate the disc in a stable manner.

Another object of the present invention is to provide a structure which would make the disc move in a stable manner over at least the portion of the disc making contact with the pickup element.

Still another object of the invention is to make the figuration of the rotating disc adjustable to keep a constant and stable contact with the pick up element.

Still another object of the present invention is to provide a structure which would enable the pick up element to move positively in a transverse direction of the disc following up the surface of the disc.

These and other objects will be apparent from the descriptions made with reference to the accompanying drawings.

Referring to the drawings,

FIG. 4 is a cross sectional view of one embodiment of the invention.

FIG. 5 shows the main point of the apparatus shown in FIG. 4.

FIG. 6 is a schematic view of the element for constituting the portion shown in FIG. 5.

FIG. 7 is a cross sectional view of the main point of another embodiment of the invention.

FIG. 8 is a cross sectional side view of the vital portion of still another embodiment of the invention.

Figure 1:
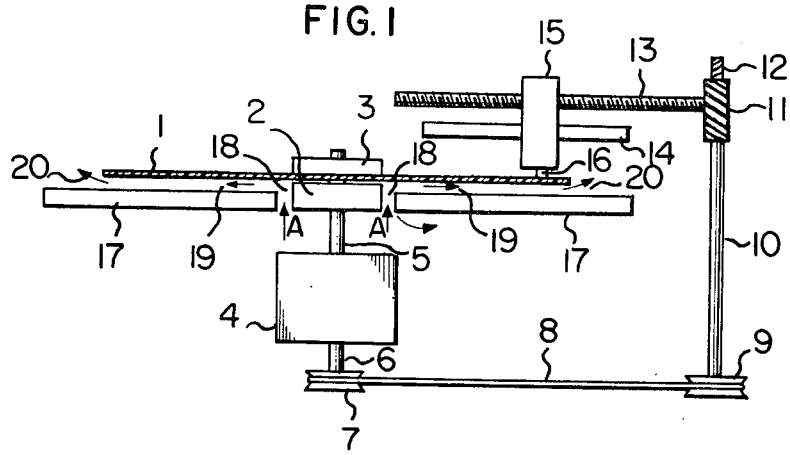
FIG. 1 shows a side elevation schematically of the disc type recording apparatus.
Figure 2:
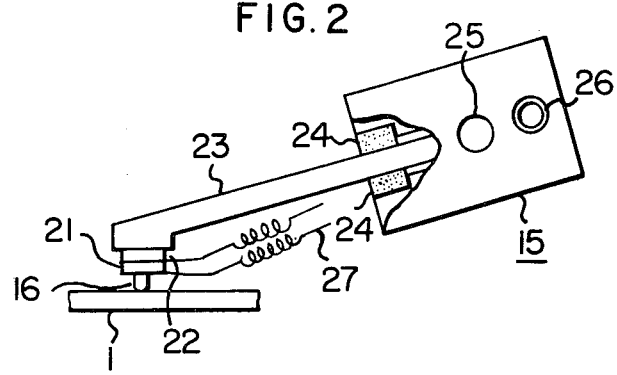
FIG. 2 shows the detail of the important portion of the apparatus shown in FIG. 1.
Figure 3:
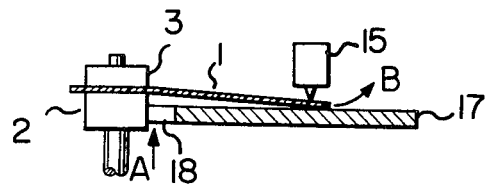
FIG. 3 shows the cross section of the disc under rotation, in a exaggerated manner.

Referring to FIG. 1 to FIG. 3, there is shown an apparatus well known to those skilled in the art, in which numeral 1 designates a disc in the form of a flexible sheet made of plastic in which the signals are recorded, the numeral 2 designates a turn table which is adapted for holding and fixing the disc 1 to the shaft, the numeral 3 designates an adapter for fixing the disc onto the turn table 2 and engaged with the thread formed in the turn table 2, the numeral 4 designates a motor which revolves at 1,800 R.P.M., to drive the turn table 2 through the medium of the upper shaft 5 and the shaft 10 through the medium of the lower shaft 6, 1st pulley 7, belt 8, and the pulley 9.

A worm gear 12 is formed on the end of the shaft 10 and is adapted for intermeshing with a large helical gear 11 which is carried by the threaded shaft 13. The threaded shaft 13 intermeshes and penetrates the threaded port of the pick up 15 so that the pick up moves transversely on the disc 1 guided by the stay 14.

The travel of the pick up 15 is so exactly selected that the pick up 15 advances positively one radial pitch of the spiral groove as the disc makes one revolution.

The disc rotates at high speed as for example 1,800 R.P.M., and it is necessary to suspend the disc in a special manner as follows.

As the disc 1 rotates air is induced as illustrated by an arrow A through the annular opening provided between the turn table 1 and the base plate 17.

The air flows radially and outwardly through the gap formed between the base plate 17 and the disc 1 as shown by an arrow 19 and escapes as shown by an arrow 20 from the circumference of the disc 1.

Such flow of air, co-operating with the centrifugal force acting on the disc, plays the role of suspension to suspend the disc 1 in a resilient manner against the contact pressure exerted by the stylus.

The detail of the pick up 15 employed in the apparatus shown in FIG. 1 is illustated in FIG. 2.

The stylus 16 is attached to the piezoelectric element 21 which is supported by the arm 23 through the resilient member 22.

The arm 23 is mounted on the pick up body through the medium of a damper 24. In the pick up body, there are formed two parts, one being a slide part 25 which is adapted for meeting and receiving the guide stay 14, and the other being the threaded port 26 for engaging with the threaded shaft 13 to shift the pick up 15 in a radial direction of the disc 1.

The contact pressure is applied downwardly onto the disc 1 by the arm which is supported by the inclined pick up body through the damper 24.

The disadvantages inherent in above described method can be listed as the following.

The flexible disc 1 tends to be distorted, the suspending air pressure varies according to the radial distance, the thickness and the stiffness of the disc cannot be exactly uniform, and the property of the material changes depending on the ambient temperature.

Under these circumstance, it is quite difficult to make the pick up element keep a constant contact with the disc through the whole reproduction process.

The contact pressure of the stylus could be increased to improve the state of contact, however, such a solution would necessarily lead to rapid wear of the stylus and would damage the disc.

Further, as viewed in FIG. 3, the pressure of air induced as shown by arrow A, would reduce gradually towards the outward portion of the disc from the disc 1 porton closer to the base plate 17 in a gradient manner.

The outside of the disc 1 is of course maintained at the atmospheric pressure, so that an abrupt pressure change would occur when the air leaves the circumference of the disc which would cause the vibration of the disc accompanied with unstable contact of the pick up element with the disc 1.

At the same time, the disc 1 tends to be bent or deformed in such a manner that the peripheral portion thereof gets closer to the base plate 17 than the central portion, as seen from FIG. 3. Therefore, it is required to gradually elevate the pick up element as it advances toward the center, in order to obtain a constant contact pressure through the whole reproduction process.

The present invention aims at overcoming such disadvantages.

FIG. 4 shows an embodiment of the present invention, in which the numerals designate the corresponding portions to those of the known apparatus shown in FIGS. 1 to 3. In this embodiment, a chalk disc 30 is provided beneath the base plate 17. The chalk disc 30 consists of a plurality of chalk elements, each of which is formed to be sector-like as shown in FIG. 6.

The sector-like chalk elements in combined manner constitute a chalk plate as shown in FIGS. 4 and 5.

The diameter of the central port 32 of the chalk plate 30 can be adjusted by displacing chalk element 31 in a direction of arrow C as viewed in the FIGS. 4 and 5, however the means for displacing the chalk element is not shown in the drawings.

It should be noted that the construction of the chalk plate 30 is not restricted to what is shown in FIG. 5; any type of construction shall be available which has an adjustable central port as for example, an iris of the type commonly used in cameras.

The central port 32 of the chalk plate 30 is aligned with the air inlet port 18, and plays the role of a chalk valve which adjusts the effective area of the inlet port 18. In this embodiment, when the center port 32 of chalk plate is adjusted to get smaller in the diameter, the outer portion of the disc 1 which has been inclined as shown in FIG. 3 gets to be almost parallel to the base plate 17 as shown in FIG. 4.

It shall be understood that the clearance or gap formed between the disc 1 and the base plate 17 can be controlled by adjusting the chalk plate 30, so that the inclination of the disc 1 suitably matches the locus of the movement of the pick up element 15, and thus good contact of the pick up element 15 with the disc 1 can be held throughout the process.

FIG. 7 shows another embodiment of the invention, in which an annular baffle plate 33 is provided on the base plate 17, surrounding the circumference of the disc. The baffle plate 33 may be provided with some intercept cut out portion in the circumference.

In this method, the air induced as shown by arrow A passes through the gap formed between the disc 1 and the base plate 17 and turns to an upward flow baffled by baffle plate 33, and escapes through the small clearance left between the disc 1 and the baffle plate 33.

Consequently, the pressure of air acting on the back side of the outward portion of the disc 1 is increased to reduce the vibration of the disc; thus the condition of the contact can be improved.

The increase of the pressure can be controlled by adjusting the distance between the baffle plate 33 and the outmost edge of the disc 1, and so the distance may be changed in accordance with the position of the pick up element 15.

Figure 9:
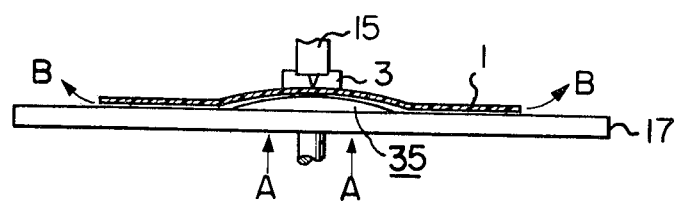
FIG. 9 shows the elevational view of the apparatus shown in FIG. 8.
Figure 10:
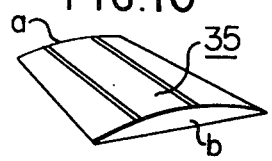
FIG. 10 is a schematic view of a part of the apparatus shown in FIG. 8 and FIG. 9.
Figure 11:
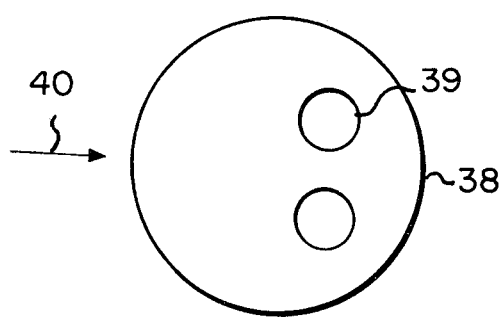
FIG. 11 is the plan view of the shoe used in still another embodiment.

FIG. 8 shows a partial cross section and FIG. 9 shows the side view as viewed from the right in FIG. 8, of the another embodiment.

Numeral 35 designates a spacer placed on the base plate 17 which is shaped to be saddle-like, the height of which is higher at one end (b) than at the other end (a). The spacer 35 is disposed with its center ridge lying in the radial direction with the lower end (a) heading for the center, so that an inclined line is observed in FIG. 8.

The contact of the pick up 15 with the disc 1 is made just above the top ridge of the spacer 35.

In this embodiment, the sectional area of passage for air flow gets gradiently narrower towards the outside of the disc 1, and the tendency of inclination of the disc 1 as seen in FIG. 3 is compensated in the portion of the disc just above the spacer 35, and this portion of the disc 1 is maintained parallel to the base plate 17. Thus the pick up element 15 comes to keep almost constant contact during the travel transversing the disc 1 in a radial direction.

Further, this portion of the disc 1 curves over a portion of circumference as seen from FIG. 9, so that the stiffness is increased at that portion of the disc against the contact pressure exerted by the stylus, which ensures a good state of the contact.

In case a different disc having a different property or characteristic is to be employed, the condition of the contact can be suitably adjusted by shifting the spacer 35 vertically or horizontally to compensate the variation of the condition according to the disc employed.

It can be noted that a suitably convexed portion formed on the base plate 17 can play the same role as the separated piece of spacer 35.

FIGS. 11 to 17 show the further embodiments of the invention.

Figure 12:
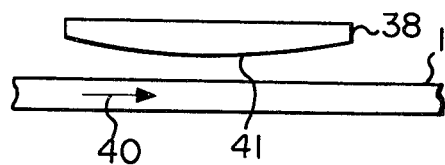
FIG. 12 shows the side elevation of the shoe shown in FIG. 11.
Figure 13:
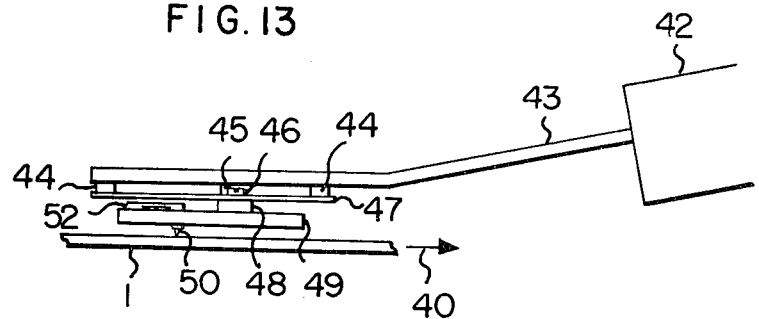
FIG. 13 shows still another embodiment in its side elevation.
Figure 14:
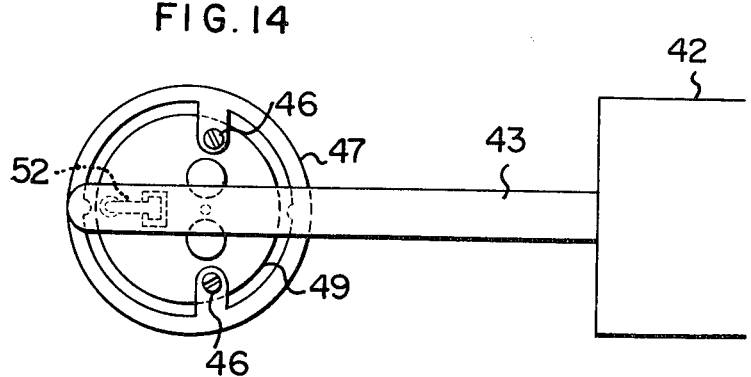
FIG. 14 is a plan view of the apparatus shown in FIG. 14.
Figure 15:
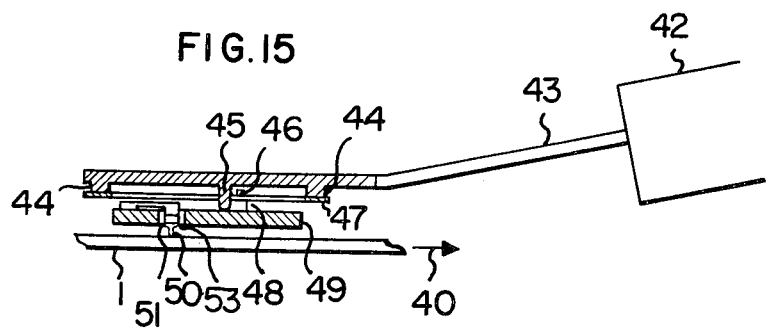
FIG. 15 is a cross sectional view of the apparatus shown in FIG. 13.

A shoe 38 of the shape as shown in FIG. 12, 16 mm in diameter, is positioned slightly spaced from the rotating disc 1.

The force is exerted on to the back face of the shoe 38 by the air flow accompaning the moving disc, to lift up the shoe 38.

This force well reaches almost 36 gr provided that the speed of the disc is 1,800 R.P.M., and the distance of the position at which the shoe 38 lies from the center of the disc 1 is 200 mm, and the gap formed between the shoe 38 and the disc 1 is maintained at 2 microns.

It is remarkable that the shoe 38 can follow the oscillation or displacement of the disc in a high fidelity.

The arrow 40 shows the direction of the movement of the disc.

Two ports 39 can be provided in the shoe 38 aiming at freeing the air under the shoe, so as to keep the required clearance between the disc and the shoe.

In some cases those ports 39 can be omitted, or in other cases grooves can be formed for letting go the air escape, instead of forming these ports, in the back face of the shoe 38.

FIG. 12 shows the side view of the shoe 38 in which the line 41 is slightly curved to modulate the clearance between the disc and the shoe. It is not always necessary to design the line 41 in a curvature; the shoe of the linear line 41 can of course be used as the occasion demands.

In this embodiment, due to the fact that the shoe can follow the oscillation or displacement of the disc in a high fidelity, very stable contact can be attained utilizing the minimum contact pressure of the stylus.

A resilient arm 43 extends from the base 42 which engages with the advancing mechanism and the stay for guiding the pick up, and carries a resilient plate 47 through seats 44. This resilient plate 47 can act as a supporting member for the shoe 49 to make the shoe keep the right posture constantly.

Namely, some discordance of the position and the inclination of the arm can be effectively absorbed and be compensated by the resilient plate co-operating with the force exerted onto the back face of the shoe 49 to lift it up.

The shoe 49 carries a stylus 50, a piezoelectric element 51 and a damper 53 in a normal way through the medium of spring 52.

The biasing force of the spring 52 is so suitably adjusted that the shoe 49 can be suspended by air keeping a predetermined distance from the disc, when the stylus is pressed against the disc with a predetermined pressure.

Thus good contact can be maintained, being freed from the change in situation due to the wearing away of the stylus, or due to the slight unavoidable variation of the clearance between the shoe and the disc, or due to the radial variation of the lifting air force.

The damper 53 is not always necessary as will be apparent to those skilled in the art.

The shoe 49 can be backed by a pivot 45, which acts to push the shoe 49 downwardly against the lifting force so as to maintain the shoe at a predetermined height from the disc 1.

The pivot also aids said resilient plate 47 to correct the posture of the shoe.

As has been described, the signal conversion apparatus of this embodiment comprises a shoe which is maintained just above the rotating disc being suspended by flowing air, and the shoe carries the signal conversion element through the medium of a biasing means.

The shoe has such positive tendency as to maintain the constant gap between itself and the disc, and so the apparatus can widely correspond to the oscillation or displacement of the disc which may have been distorted during the handling process, which ultimately ensures the desired correct reproduction avoiding the undesirable amplitude modulation of the output.

Further, the wear of the stylus can be greatly reduced because the minimum contact pressure is effectively utilized in this method.

It will be apparent to those skilled in the art that a signal conversion element such as that of the electromagnetic type or semi-conductor type may be used instead of the above described piezoelectric one.

It is preferred to reduce the biasing force of the arm gradually as the shoe gets nearer to the center of the disc, in order to compensate for the decrease of lifting force due to the reduction of the circumferential velocity.

References have been made to the apparatus using a rotary disc, but this method is of course applicable to the apparatus which employs another type of recording medium such as for example a tape like one which moves at high speed.

Also, the reference having been made to the apparatus in which the method of the aural recording is applied to the field of television signals, the present invention is applicable to the magnetic recording method.

Figure 16:
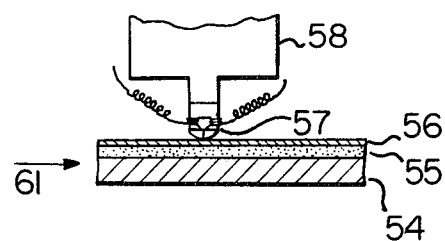
FIG. 16 shows a side elevational view of the further embodiment of the invention.

Referring to FIG. 16, which is illustrating what is called a magnetic sheet method, there is a disc 54 made of for example aluminum on which the soft resilient sheet 55 is applied, the surface of which is highly smoothened and covered with magnetic sheet 56.

When operated, the magnetic head 57 is pressed onto the rotating surface, being moved by base 58 to record and to reproduce the signals.

As a matter of fact, the resilient sheet 55 cannot be so highly smoothened as is desired, and the magnetic sheet would often shiver or extend, so that the contact of the head 57 with the sheet 56 would be disturbed.

The contact pressure could be increased, but such a method leads to the damage of the head 57. The present invention, applied to this magnetic sheet method, can solve such problems..

For this purpose, one has only to replace the piezoelectric element and the stylus with the magnetic head, and by doing so recording and reproduction can be freed from the undesirable condition of the sheet, hence, the sheet and the head become available for a longer period.

Figure 17:
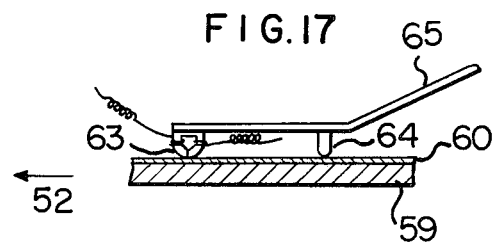
FIG. 17 shows still further embodiment in its side elevation.

FIG. 17 shows what is called the magnetic disc method, in which a disc 59 made of for example aluminum is coated with a magnetic substance galvanized or applied thereon.

The recording and the reproduction is made by contacting the head 63 and the shoe 64 carried by the arm 65 to the magnetic substance.

In this method there are also some disadvantages such as for example the rapid wearing away of the head and the shoe due to the excess biasing force, damage on the disc, and the variation in the reproduction output, all of which are avoided by adopting the apparatus of the present invention.

What is claimed is:

1. An apparatus for recording and reproducing signals, comprising a disc-like recording medium made of flexible material, a base plate, a turntable having an engaging portion which protrudes from the surface of the base plate and engages with the central portion of said recording medium to support said recording medium, driving means coupled to said turntable for rotating said turntable at high speed, an air inlet port formed in said base plate and located in the position corresponding to the central portion of said recording medium supported by said turntable, a pickup device which moves in a radial direction of and makes contact with said recording medium, and a convexity provided on said base plate and located between said recording medium and said base plate, said convexity being located under the radial moving path of said pickup device and extending from near the outer periphery of said recording medium towards the center of rotation of said recording medium, the height of said convexity from the base plate getting gradually smaller towards the center of rotation of said recording medium.

2. An apparatus for recording and reproducing signals comprising a disc-like recording medium made of flexible material, a base plate, a turntable having an engaging portion which protrudes from the surface of the base plate and engages with the central portion of said recording medium to support said recording medium, driving means coupled to said turntable for rotating said turntable at high speed, an air inlet port formed in said base plate and located in the position corresponding to the central portion of said recording medium supported by said turntable, a pickup device which moves in a radial direction of said recording medium, and at least one air baffle plate provided on said base plate, the outer lower periphery of said baffle plate contacting said base plate and maintaining a clearance from said recording medium, the outer upper periphery of said baffle plate being positioned above the plane of rotation of said recording medium.

3. An apparatus as claimed in claim 2, wherein said air baffle plate is displaceable so as to adjust the clearance between said baffle plate and the outermost edge of said recording medium.

4. An apparatus as claimed in claim 3, wherein said air baffle plate is displaceable in accordance with the position of said pickup device.

5. An apparatus for recording and reproducing signals, comprising: a disc-like recording medium having a central portion, said medium being made of flexible material; a base plate; a turntable having a part which protrudes from a surface of the base plate to engage and support said recording medium, said part engaging and supporting said recording medium in the vicinity of said central portion thereof; driving means coupled to said turntable for rotating said turntable at high speed; an air inlet port formed in said base plate and located in a position corresponding to said central portion of said recording medium; a shoe maintained adjacent to and above said recording medium, a first resilient member for supporting said shoe; a second resilient member having a resilient force less than that of said first resilient member, one end of said second resilient member being fixed to said shoe and the other end being spaced from said first resilient member when said shoe is in its rest position; and a pick up device fixed to the one end of said second resilient member and in contact with said recording medium, wherein said shoe is arranged to be held in a predetermined position above said recording medium by a suspending force due to air flow accompanied with rotation of said recording medium against the resilient force of said first resilient member.

6. An apparatus as defined in claim 5 further comprising means for displacing said shoe in a radial direction of said recording medium, and wherein said base plate has a convexity along the direction of displacement of said shoe.

* * * * *